United States Patent
Becker et al.

(10) Patent No.: US 10,257,599 B2
(45) Date of Patent: Apr. 9, 2019

(54) SLACK AND STRAIN CONTROL MECHANISM

(71) Applicant: International Business Machines Corporation, Armonk, NY (US)

(72) Inventors: Wiren D. Becker, Hyde Park, NY (US); Marc H. Coq, Hopewell Junction, NY (US); Milnes P. David, Poughkeepsie, NY (US); Ryan N. Elsasser, Poughkeepsie, NY (US); Syed F. Hossain, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 421 days.

(21) Appl. No.: 14/949,294

(22) Filed: Nov. 23, 2015

(65) Prior Publication Data
US 2017/0146153 A1  May 25, 2017

(51) Int. Cl.
*H04R 1/10* (2006.01)
*H04M 1/05* (2006.01)

(52) U.S. Cl.
CPC .............. *H04R 1/10* (2013.01); *H04M 1/05* (2013.01); *H04R 1/1033* (2013.01)

(58) Field of Classification Search
CPC .... H04R 1/1033; H04R 1/1058; H04R 1/028; H04R 1/10; H04R 1/1016; H04R 1/1075; H04M 1/15; H04M 1/05; H04M 1/6058; A61F 11/12; A61F 11/14; A45F 5/00; H01B 7/06; H01B 7/40; H01B 7/17; H01B 7/18; H01B 5/006
See application file for complete search history.

(56) References Cited

U.S. PATENT DOCUMENTS 5,927,659 A * 7/1999 Yang .................. H04R 1/1033
                                                  181/129
7,139,405 B1  11/2006 Grattan et al.
(Continued)

FOREIGN PATENT DOCUMENTS

CN       201409214 Y    2/2010
CN       201887920 U    6/2011
(Continued)

OTHER PUBLICATIONS http://www.aliexpress.com/store/product/2PCS-Fish-Bone-cable-winder-Earphone-Cable-Wire-Headphone-Cord-Organizer-Holder-Winder-for-MP3-Phone/1184453_2011367487.html; Sep. 28, 2015; 3 pages.
(Continued)

Primary Examiner — Jun S Yoo
(74) Attorney, Agent, or Firm — Cantor Colburn LLP; Tihon Poltavets (57) ABSTRACT

An assembly is provided including a flexible conduit and a device connectable to a generally central portion of the flexible conduit. The device includes a base. Movement of the base relative to an adjacent surface is restricted. At least one biasing assembly is attached to the base. The generally central portion of the flexible conduit is connected to the at least one biasing assembly. The at least one biasing assembly is configured to deform when a force is applied near a first end of the flexible conduit such that the force is not transmitted to a second end of the flexible conduit.

12 Claims, 7 Drawing Sheets

(56) References Cited

U.S. PATENT DOCUMENTS

2005/0031146 A1\* 2/2005 Baskerville .......... H04R 1/1016
381/328
2016/0254076 A1\* 9/2016 Kulas ..................... H01R 24/58
174/74 R

FOREIGN PATENT DOCUMENTS

CN 201957222 U 8/2011
KR 200462380 Y1 9/2012

OTHER PUBLICATIONS http://www.aliexpress.com/store/product/Radiation-Proof-Spiral-piper-Earbuds-headset-Spring-Type-Retractable-Earphone-in-Ear-3-5mm-Jack-Cell/1454371_32387318532.html; Sep. 25, 2015; 7 pages.
http://www.aliexpress.com/store/product/Spring-Retractable-Metal-Head-3-5MM-Male-to-Male-Car-Aux-audio-Cable-Extended-Audio-Headphone/1761056_32341228210.html; Sep. 25, 2015; 4 pages.

\* cited by examiner

SLACK AND STRAIN CONTROL MECHANISM

BACKGROUND

The present invention relates to the general field of flexible conduits, and more specifically, to a device for minimizing strain applied to flexible conduits.

Wires, cords, hoses, and other generally unshaped flexible conduits are often provided in standard lengths. Based on the application, when these conduits are in use, an excess portion of the conduit typically remains slackened. As a result, this loosely hanging portion of the conduit is often more susceptible to being caught on items. For example, when a user is wearing earphones connected to an electronic device, a portion of the cord may be caught on an adjacent piece of furniture or equipment, such as a door handle for example. When the cord is caught an accidental force may be applied to the cord, causing the cord to disconnect from the electronic device, or the earphones to pull out of the user's ears.

Accordingly, there is a need for a device that can reduce the slack portion of a loose conduit and absorb a force applied to the conduit.

SUMMARY

According to an embodiment of the present invention, an assembly is provided including a flexible conduit and a device connectable to a generally central portion of the flexible conduit. The device includes a base. Movement of the base relative to an adjacent surface is restricted. At least one biasing assembly is attached to the base. The generally central portion of the flexible conduit is connected to the at least one biasing assembly. The at least one biasing assembly is configured to deform when a force is applied near a first end of the flexible conduit such that the force is not transmitted to a second end of the flexible conduit.

According to an embodiment of the present invention, a device includes a base and at least one biasing assembly attached to the base. Movement of the base relative to an adjacent surface is restricted. The at least one biasing assembly is configured to couple to a generally central portion of a flexible conduit. The at least one biasing assembly is configured to deform when a force is applied near a first end of the flexible conduit such that the force is not transmitted to a second end of the flexible conduit.

According to another embodiment, a method is provided including connecting a generally central portion of a flexible conduit to a biasing assembly of a device. The base of the device is positioned adjacent a surface such that the base does not move relative to the surface. A force is applied near a first end of the flexible conduit. The biasing assembly deforms such that the force is not transmitted to a second end of the flexible conduit.

DETAILED DESCRIPTION

With reference now to the FIGS., a strain device 20 that allows for dynamic adjustment of a generally unshaped hose, cord, wire, cable, or other flexible conduit 10 is illustrated. As shown, the device 20 includes a base 22. The base 22 is configured to contact an adjacent surface and act as an anchor, thereby restricting movement of the base 22 relative to the adjacent surface. The base 22 may be connected to the adjacent surface via a connecting device, such as a clip, pin, or magnet for example. In another embodiment, the portion of the base 22 configured to contact the adjacent surface is roughened, knurled, or otherwise textured such that the friction between that portion of the base 22 and the adjacent surface limits movement of the base 22 relative to the adjacent surface.

Figure 1:
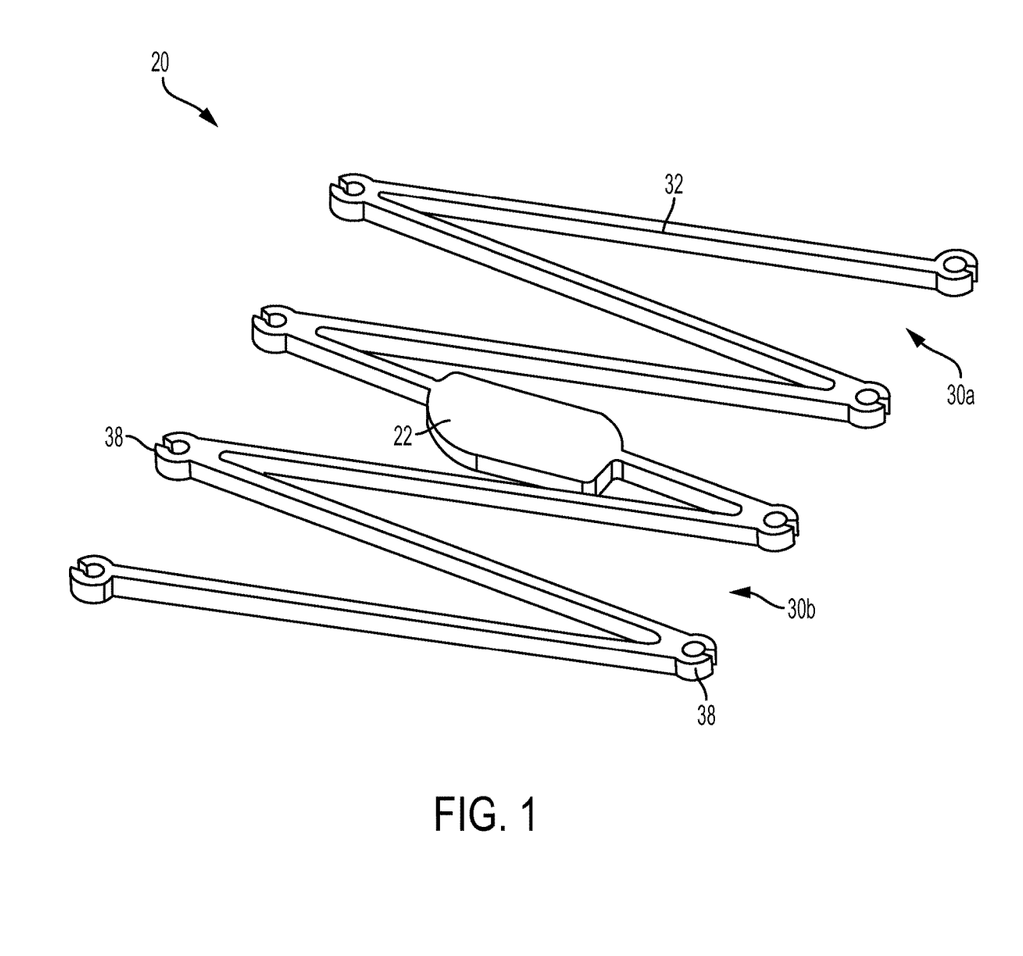
FIG. 1 is a perspective view of an example of a strain device according to an embodiment.

The device 20 additionally includes one or more biasing assemblies 30. A portion of the biasing assembly 30 is attached to the base 22, such as with a weld or other fastener for example. Alternatively, the biasing assembly 30 may be integrally formed with a portion of the base 22, as shown in FIG. 1. The biasing assembly 30 is constructed from any resilient material, including but not limited to at least one of plastic, metal, and composite for example. In addition, the device 20 may be manufactured via injection molding, additive manufacturing, or any other suitable process.

The biasing assembly 30 defines a biasing axis X about which the biasing assembly 30 is configured to expand and contract. Due to the resilient nature of the biasing assembly 30, when a force applied to the biasing assembly 30 is released, the assembly 30 is configured to bias back to an original position. The relationship between a spring force and displacement of the biasing assembly 30 may be selected based on the application of the device 20. In one embodiment, the relationship between the spring force and displacement of the biasing assembly 30 is generally linear. However, a biasing assembly 30 having a non-linear spring force-displacement relationship is also within the scope of the disclosure.

Figure 4:
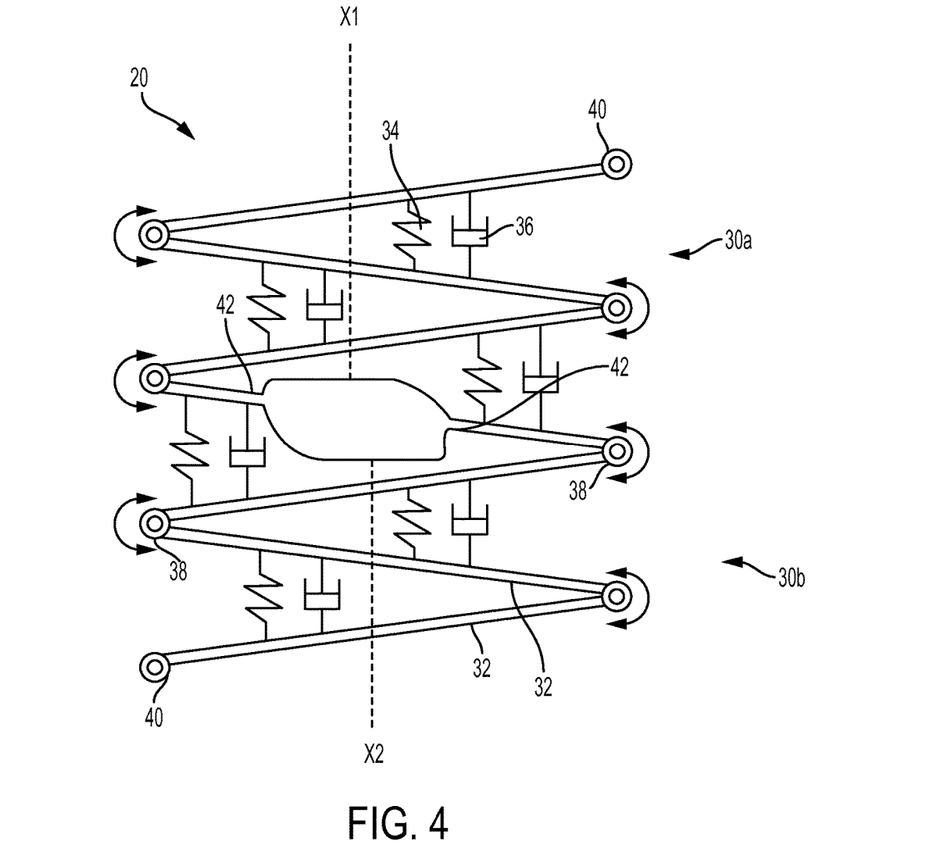
FIG. 4 is a front view of another strain device attached thereto according to an embodiment.

In one embodiment, the biasing assembly 30 may be formed from a single contoured member 32, as shown in the FIG. 1, or may include a plurality of connecting members 32 coupled together (FIG. 4). In the embodiment illustrated in FIG. 4, the biasing assembly 30 may include one or more biasing mechanisms 34, such as a spring for example, located between adjacent surfaces of the one or more members 32. Alternatively, or in addition, a damping mechanism 36, such as a damper for example, may be positioned between adjacent surfaces of the one or more members 32.

Figures 2, 3:
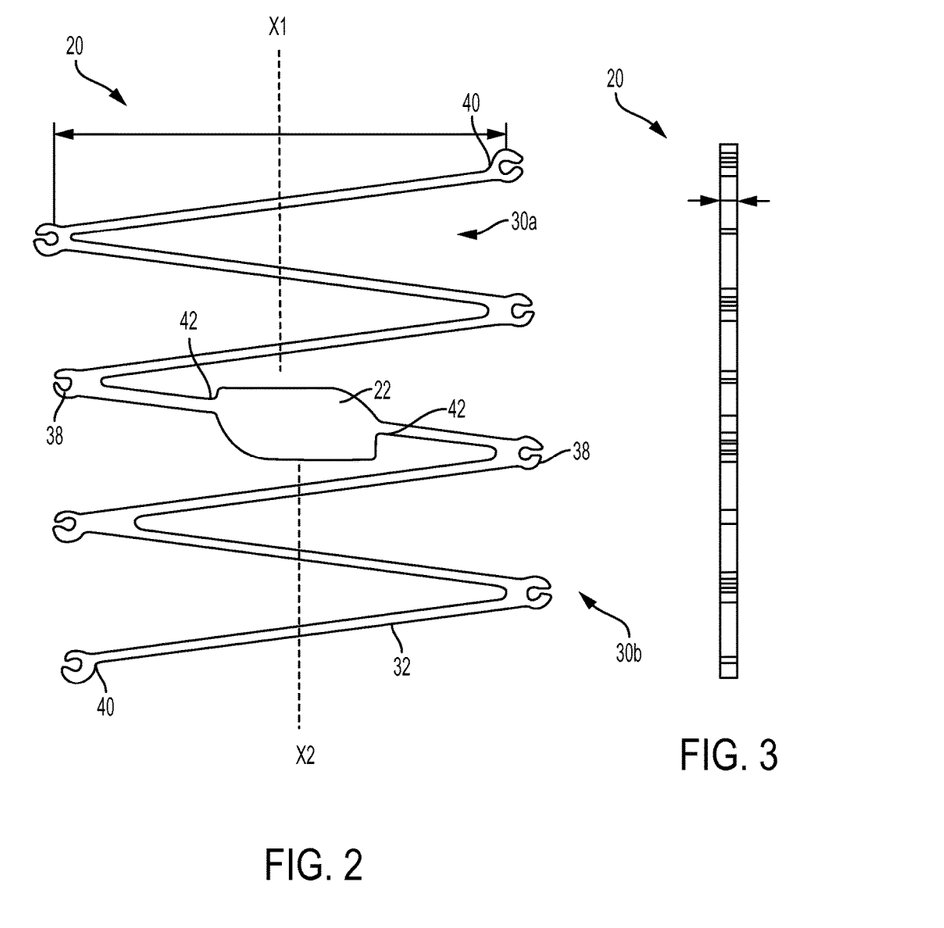
FIG. 2 is a front view of the strain device of FIG. 1 in according to an embodiment.
FIG. 3 is a side view of the strain device of FIG. 1 in according to an embodiment.

The size and shape of the biasing assembly 30 is determined based on the intended application of the device 20. As shown in FIGS. 1-2, a length and width of the device 20 may be substantially greater than a thickness thereof, such that the biasing assembly 30 is considered to have a generally planar or two-dimensional configuration. For example, the device 20 shown is intended for use with a thin conduit having a diameter of less than 0.15 inches, such as the cord of a pair of earphones for example. In such embodiments, the device 20 has a width of about 3.45 inches, a length of at least 3.45 inches, and a width of only 0.13 inches. It should be understood that a device 20 may alternatively have a three-dimensional configuration, for example in embodiments where the biasing assembly 30 is a coil spring.

The device 20 shown in the FIGS. includes a plurality of biasing assemblies 30. As shown, a first biasing assembly 30a is coupled to the base 22 and extends therefrom in a first direction and a second biasing assembly 30b is connected to the base 22 and extends therefrom in a second, opposite direction. Although the first biasing assembly 30a and the second biasing assembly 30b are connected via the base 22, the biasing assemblies 30a, 30b are isolated from one another and are therefore configured to operate independently. The restricted movement of the base 22 relative to the adjacent surface prevents a force applied to one of the plurality of biasing assemblies 30 from being transmitted to another of the plurality of biasing assemblies 30.

Each biasing assembly 30 includes one or more couplers 38 for attaching a cord, wire, cable, or other flexible conduit 10 thereto. In one embodiment, the base 22 may additionally include at least one coupler 38. The connection between the conduit 10 and each coupler 38 is generally rigid such that minimal or no movement of the conduit 10 relative to the coupler 38 occurs. In the illustrated, non-limiting embodiment, the couplers 38 are formed having an opening generally complementary to a size and shape of the conduit 10. As shown, the couplers 38 are formed from a resilient material such that the conduit 10 may be attached to the couplers 38 via a press fit connection. It should be understood that other types of couplers 38 for receiving a portion of the conduit 10, such as a clip or pin for example, are also within the scope of the disclosure.

The couplers 38 of the biasing assembly 30 may be generally fixed relative to the device 20. For example, as shown in FIGS. 1 and 2, the couplers 38 are formed such that the conduit 10 received within each coupler 38 extends generally perpendicularly to the axis of the biasing assembly 30. Alternatively, the couplers 38 may have another configuration or may be able to move or rotate about one or more degrees of freedom to provide a user with greater flexibility in how the conduit 10 is connected thereto (see FIG. 4).

The couplers 38 may be arranged at any location on the biasing assembly 30. In one embodiment, the couplers 38 are arranged at an outer periphery of the biasing assembly 30 to provide accessibility for a user of the device 20. When the biasing assembly 30 is formed from a plurality of joined connection members 32, the couplers 38 may be located at one or more of the interfaces between adjacent connection members 32. By including a plurality of couplers 38 at various positions between the free end 40 and the end 42 of the biasing assembly 30 connected to the base 22, a portion of the length of the conduit 10 may be wrapped around the biasing assembly 30. As a result, the slack or excess length of the conduit 10 may be neatly taken up by the device 20, thereby leaving only a necessary amount of the conduit 10 exposed.

Figure 6:
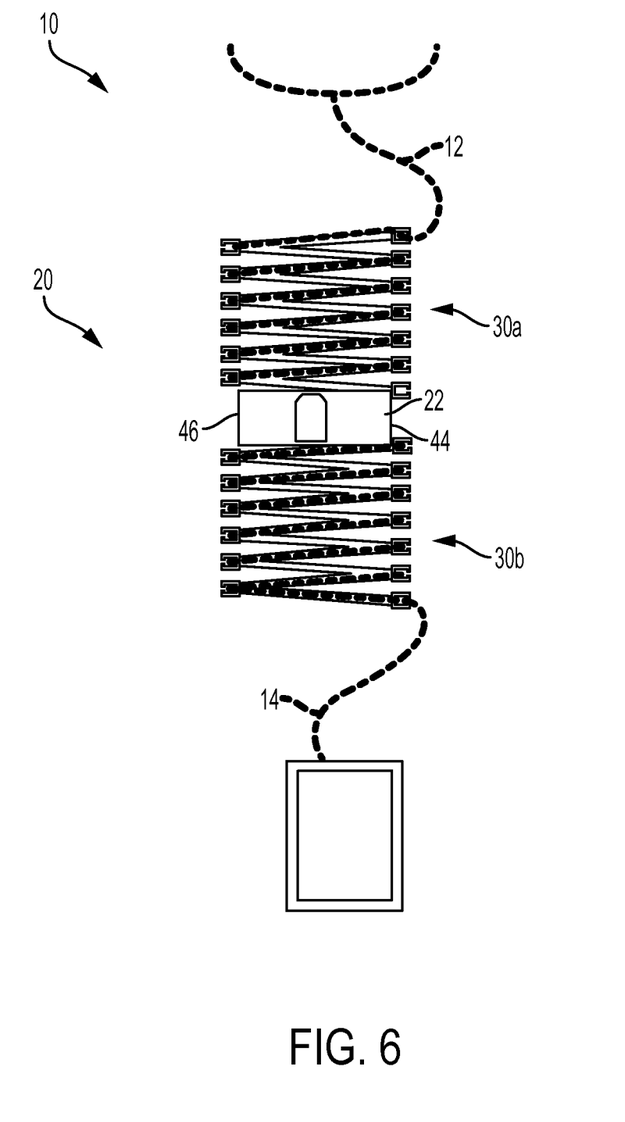
FIG. 6 is a front view of a strain device having an unshaped flexible conduit attached thereto according to an embodiment.

With reference now to FIG. 6, to use the device 20, a user mounts the flexible conduit 10, such as the cord of a set of earphones for example, to at least a portion of the plurality of the couplers 38. In one embodiment, a generally centralized portion of the conduit 10 is mounted to the device 20 such that both the end 12 of the earphones configured to connect to an ear and the end 14 of the earphones configured to connect to an electronic device are movable relative to the device 20. When affixing the conduit 10 to the device 20, the conduit 10 should be mounted to a first coupler 38 adjacent a first side 44 of the device 20, and then mounted to a second coupler 38 adjacent the second side 46 of the device 20 such that the conduit 10 extends across a portion of the width of the device 20. The conduit 10 should then be connected to another coupler 38, such as located towards the first side 44 of the device 20 and so on such that the conduit 10 is wrapped about the periphery of the device 20. In embodiments where the device 20 includes a plurality of biasing assemblies 30, the conduit 10 may be connected to one or more couplers 38 of only one of the plurality of biasing assemblies 30 or one or more couplers 38 of multiple biasing assemblies 30.

Figure 5:
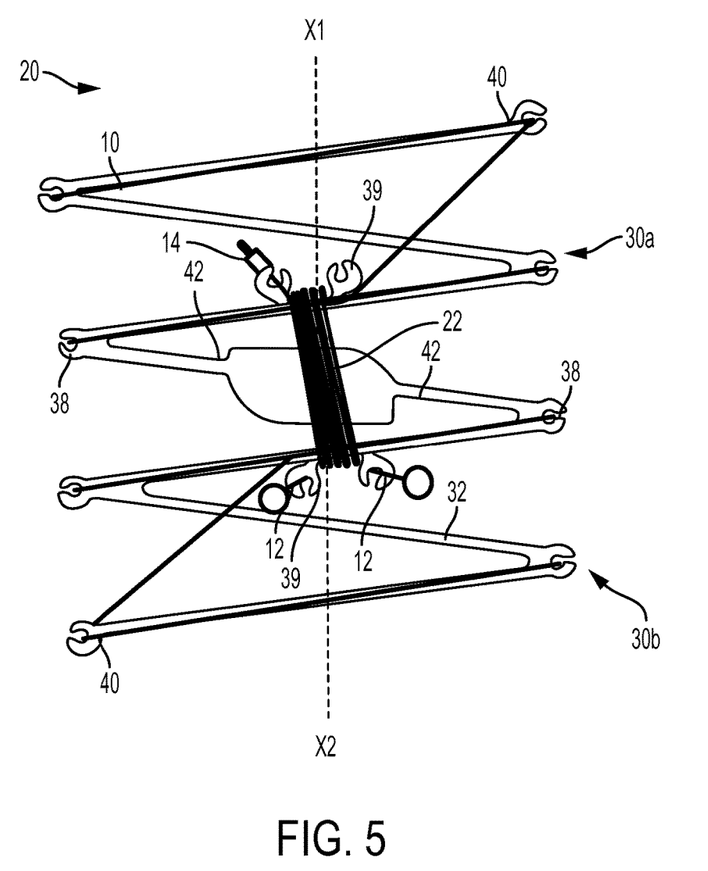
FIG. 5 is a front view of a strain device having an unshaped flexible conduit attached thereto according to an embodiment.

In the non-limiting embodiment illustrated in FIG. 5, one or more couplers 39, similar to or different than coupler 38, are located near a central portion of the contoured member 32 adjacent the base 22. These couplers 39 may be used during normal attachment of the flexible conduit 10, or alternatively, may be used to store the ends of the conduit 10 when the conduit 10 is not in use. Further, these couplers 39 may be positioned such that the ends of the flexible conduit 10 are wrapped in a direction generally perpendicular to the central portion of the flexible conduit 10. By including these additional couplers 39, the ends 12, 14 of the conduit 10 can be easily wound and unwound without removing the flexible conduit 10 from the device 20.

The conduit 10 is wrapped about the device 20 until a desired amount of slack is taken up about the device 20 and only a desired or necessary length of the conduit 10 remains loose and movable relative to the device 20. The device 20 may be designed such that at least one biasing assembly 30 thereof has an oversized length. Depending on the length of excess conduit 10 to be wrapped about the device 20, all or only a portion of the couplers 38 may be used. In embodiments including additional couplers 38, a user may remove a portion of the biasing assembly 30 adjacent the free end 40 to form a biasing assembly 30 having a minimum required length.

Figure 7:
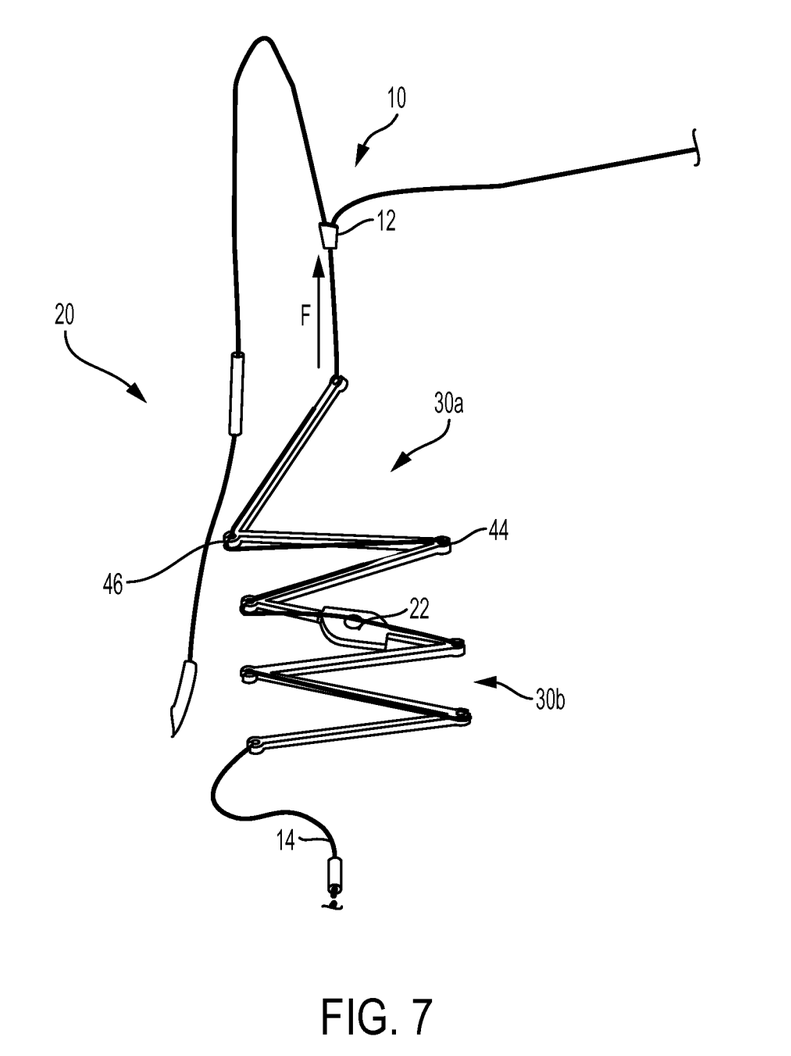
FIG. 7 is a front view of a strain device having an unshaped flexible conduit attached thereto in a normal position according to an embodiment.
Figure 8:
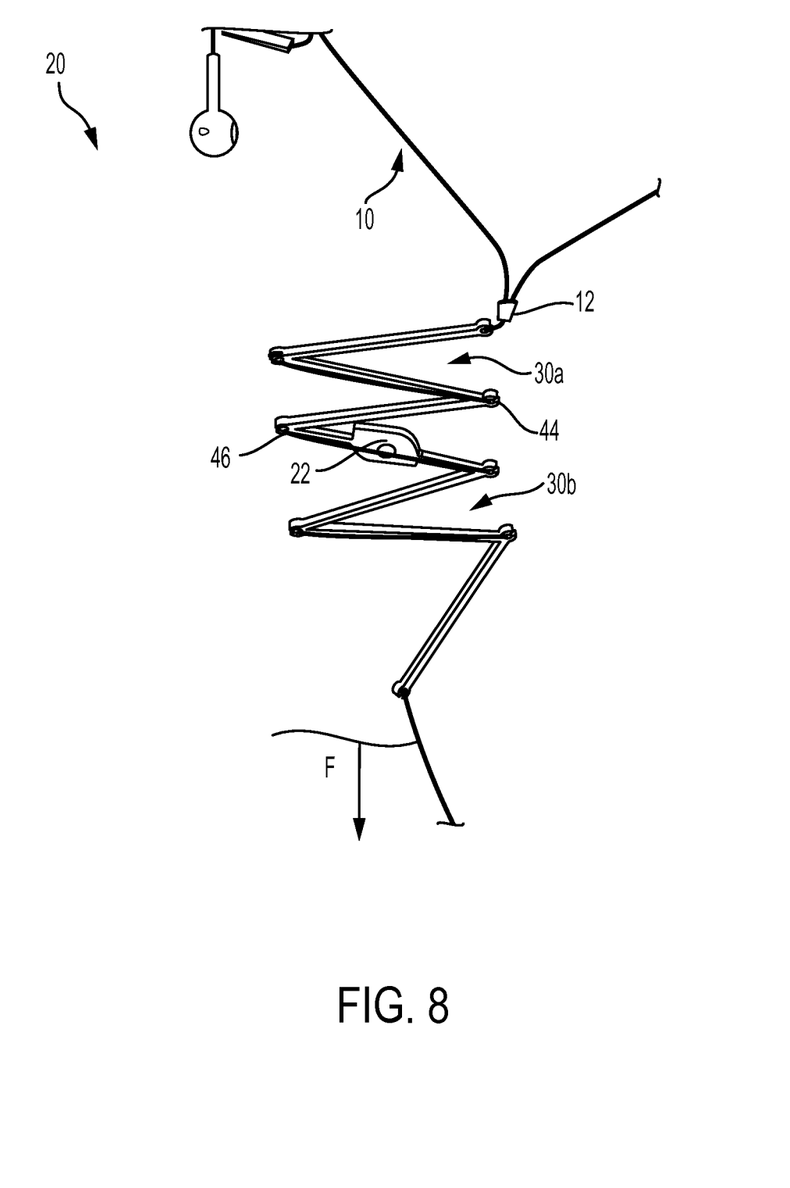
FIG. 8 is a front view of a strain device having an unshaped flexible conduit attached thereto in a deformed position according to an embodiment.

With reference now to FIGS. 7 and 8, when the device 20 is applied to earphones, the adjacent surface arranged in contact with the base 22 may be an article of clothing worn by the user. As a result, the base 22 will not move relative to the user. If a force is applied to the conduit 10 near the free end 40 of the first biasing assembly 30, only the first biasing assembly 30 moves about a respective biasing axis X1. Similarly, if a force is applied to the conduit 10 near the free end 40 of the second biasing assembly 30, only the second biasing assembly 30 moves about a respective biasing axis X2.

The strain device 20 as described herein prevents an end of a wire, cable, cord, or other flexible conduit 10 connected to the device 20, from being disconnected from an adjacent component when a force is applied thereto. By taking up to slack of the flexible conduit 10, the conduit 10 may also be less likely to have unintentional forces act thereon. The strain device 20 may also function as a storage device to prevent the flexible conduit 10 from becoming tangled with itself of other cables or cords.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An assembly comprising:
    a flexible conduit; and
    a device connectable to a generally central portion of the flexible conduit, the device including:
        a base, wherein movement of the base relative to an adjacent surface is restricted; and
        at least two biasing assemblies attached to opposing ends of the base, the generally central portion of the flexible conduit being connected to the at least two biasing assemblies, wherein each of the at least two biasing assemblies are configured to deform when a force is applied near a first end of the flexible conduit such that the force is not transmitted to a second end of the flexible conduit,
    wherein the flexible conduit is mounted about a periphery of the at least one biasing assembly such that slack in the flexible conduit is taken up by the device.

2. The assembly according to claim 1, wherein the at least one biasing assembly includes a single contoured member.

3. The assembly according to claim 1, wherein the at least two biasing assemblies each include a plurality of contoured members connected to one another.

4. The assembly according to claim 1, wherein the at least two biasing assemblies each include at least one biasing mechanism.

5. The assembly according to claim 1, wherein the at least two biasing assemblies each include a damping mechanism.

6. The assembly according to claim 1, wherein the at least two biasing assemblies each are integrally formed with the base.

7. The assembly according to claim 1, wherein the at least two biasing assemblies each include a plurality of couplers, the flexible conduit being attached to at least a portion of the plurality of couplers.

8. The assembly according to claim 1, wherein the at least two biasing assemblies includes a first biasing assembly extending from the base in a first direction and a second biasing assembly extending from the base in a second direction opposite the first direction, wherein the first biasing assembly is configured to deform such that the force is not transmitted to second biasing assembly, and the second biasing assembly is configured to deform such that the force is not transmitted to first biasing assembly.

9. The assembly according to claim 1, wherein the base includes a connector for attaching to the adjacent surface.

10. The assembly according to claim 1, wherein a portion of the base is textured, such that friction generated between a textured portion of the base and the adjacent surface restricts movement of the base relative to the adjacent surface.

11. The assembly according to claim 1, wherein the flexible conduit includes at least one of a cable, wire, cord, or hose.

12. The assembly according to claim 10, wherein the cord is a portion of a pair of headphones.

* * * * *